US007033543B1

(12) United States Patent
Panzer et al.

(10) Patent No.: US 7,033,543 B1
(45) Date of Patent: Apr. 25, 2006

(54) PIPETTE TIP, PIPETTING DEVICE AND COMBINATION CONSISTING OF A PIPETTE TIP AND PIPETTING DEVICE

(75) Inventors: Armin Panzer, Trin (CH); Johann L. Camenisch, Chur (CH)

(73) Assignee: Hamilton Bonaduz AG, (CH)

( * ) Notice: Subject to any disclaimer, the term of this patent is extended or adjusted under 35 U.S.C. 154(b) by 0 days.

(21) Appl. No.: 09/959,132

(22) PCT Filed: Apr. 14, 2000

(86) PCT No.: PCT/EP00/03423

§ 371 (c)(1),
(2), (4) Date: Oct. 16, 2001

(87) PCT Pub. No.: WO00/62933

PCT Pub. Date: Oct. 26, 2000

(30) Foreign Application Priority Data

Apr. 16, 1999 (DE) ................................ 199 17 375

(51) Int. Cl.
*B01L 3/02* (2006.01)
*G01N 1/22* (2006.01)
*G01N 1/00* (2006.01)
*G01N 1/14* (2006.01)

(52) U.S. Cl. ................... 422/100; 422/931; 73/863.32; 73/864; 73/864.01; 73/864.14

(58) Field of Classification Search .......... 422/99–100, 422/931; 73/863.32, 864, 864.01, 864.14

See application file for complete search history.

(56) References Cited

U.S. PATENT DOCUMENTS 3,732,734 A * 5/1973 Avakian .................. 73/864.14
4,072,330 A * 2/1978 Brysch .................... 73/864.14
4,187,724 A 2/1980 Citrin
4,748,859 A * 6/1988 Magnussen et al. ..... 73/864.01
4,824,641 A 4/1989 Williams
4,961,350 A 10/1990 Tennstedt
5,021,217 A * 6/1991 Oshikubo ................... 422/100
5,063,790 A 11/1991 Freeman
5,200,151 A * 4/1993 Long .......................... 422/100
5,232,669 A 8/1993 Pardinas (Continued)

FOREIGN PATENT DOCUMENTS

DE 3824767 2/1990

(Continued)

*Primary Examiner*—Jill Warden
*Assistant Examiner*—Brian R. Gordon
(74) *Attorney, Agent, or Firm*—Kilpatrick Stockton, LLP

(57) ABSTRACT

A pipette device has a coupling stud on which a pipette tip can be stuck in a slipping-on direction for coupling. The coupling stud has an adjustable pre-stress member that can be adjusted into a prestress state and a release state via an actuation device which is provided in the coupling stud. The pipette tip has an axial stop which interacts with a counter-stop of the coupling stud in an axial coupling position of the pipette tip. The prestress member in its prestress state acts upon a working surface of the stuck-on pipette tip having a surface component of the pipette tip, which extends radially inward, turned away from the stuck on direction, in such a way that it abuts sealingly on the working surface, and prestresses the pipette tip on the pipette unit into the axial coupling position. The prestress member, in its releasing state, substantially releases the working surface of the pipette tip (101).

15 Claims, 6 Drawing Sheets

U.S. PATENT DOCUMENTS

| | | | | |
|---|---|---|---|---|
| 5,496,523 | A | 3/1996 | Gazit | |
| 5,525,302 | A * | 6/1996 | Astle | 422/100 |
| 5,580,529 | A * | 12/1996 | DeVaughn et al. | 422/101 |
| 5,660,797 | A | 8/1997 | Jarvimaki | |
| 5,827,745 | A * | 10/1998 | Astle | 436/54 |
| 5,851,491 | A | 12/1998 | Moulton | |
| 5,874,048 | A | 2/1999 | Seto | |
| 5,948,359 | A * | 9/1999 | Kalra et al. | 422/65 |
| 6,168,761 | B1 * | 1/2001 | Kelly et al. | 422/100 |
| 6,197,259 | B1 * | 3/2001 | Kelly et al. | 422/100 |
| 6,499,363 | B1 * | 12/2002 | Shigematsu et al. | 73/864.01 |
| 6,596,240 | B1 * | 7/2003 | Taggart et al. | 422/100 |
| 6,627,160 | B1 * | 9/2003 | Wanner | 422/100 |
| 6,673,318 | B1 * | 1/2004 | Nishimura | 422/100 |
| 6,749,812 | B1 * | 6/2004 | Cronenberg et al. | 422/100 |
| 6,841,130 | B1 * | 1/2005 | Lehtinen et al. | 422/100 |
| 6,871,557 | B1 * | 3/2005 | Magnussen et al. | 73/864.01 |
| 6,874,379 | B1 * | 4/2005 | Matsuda et al. | 73/864.14 |
| 2001/0036425 | A1 * | 11/2001 | Gazeau et al. | 422/100 |
| 2002/0001545 | A1 * | 1/2002 | Cronenberg et al. | 422/100 |
| 2003/0082078 | A1 * | 5/2003 | Rainin et al. | 422/100 |
| 2003/0219359 | A1 * | 11/2003 | Lenz et al. | 422/100 |
| 2004/0071602 | A1 * | 4/2004 | Yiu | 422/100 |
| 2004/0208793 | A1 * | 10/2004 | Jarvimaki et al. | 422/100 |
| 2005/0089450 | A1 * | 4/2005 | Al-Mahareeq et al. | 422/100 |
| 2005/0175511 | A1 * | 8/2005 | Cote et al. | 422/100 |

FOREIGN PATENT DOCUMENTS

| | | |
|---|---|---|
| EP | 148 333 | 4/1985 |
| EP | 0 148 333 | 7/1985 |
| EP | 0 293 075 | 11/1988 |
| EP | 337 726 | 10/1989 |
| EP | 0 733 404 | 9/1996 |
| EP | 0 760 255 | 3/1997 |
| GB | 272218 | 9/1986 |
| JP | 06320021 | 11/1994 |

* cited by examiner

PIPETTE TIP, PIPETTING DEVICE AND COMBINATION CONSISTING OF A PIPETTE TIP AND PIPETTING DEVICE

TECHNICAL FIELD

The invention concerns the placement of a pipette tip on a pipette device.

BACKGROUND OF THE INVENTION

Pipette devices are used, for example, in the area of molecular biology or medicinal analysis for the transfer of liquids. Special pipette tips are thereby often used which are placed on the pipette device and are intended for one-time use. Such disposable tips are also known by the designation "tip." The pipette device may be a manual pipette device which merely has one single pipette unit. In the course of progressive automation, which is making its entrance into modern analysis laboratories, automated pipettes or so-called pipette robots having a large number of pipette units arranged in a row or in a matrix are also often used. With such automated pipettes, it is possible to suction samples simultaneously from a large number of vessels and to release them elsewhere.

The pipette tips have been constructed, up to now, mostly with a jacket area, which expands conically with which they are mounted on a correspondingly conically shaped coupling stud of the pipette device or preferably of the individual pipette unit. The pipette tip is thereby pressed onto the coupling stud firmly to establish a frictionally engaged press fit between the pipette tip and the coupling stud. In order to achieve the desired tightness comparatively high pressing forces are required. The material of the pipette tip has a certain elasticity which leads to the pipette tip expanding upon pressing onto the coupling cone. In this way microfissures may be formed in the pipette tip which are a cause of leakage. Also dirt particles on the coupling cone may lead to leakage. Moreover the high pressing forces upon placement of the pipette tip have the disadvantage that for the release of the pipette tip correspondingly high forces have to be applied.

To avoid high pressing forces it has been proposed (see U.S. Pat. No. A-5,063,790) that the coupling stud be constructed with an O-sealing ring. The pipette tip is thereby put more loosely over the coupling stud. The O-sealing can then be compressed by means of a squeezing device in such a manner that it expands in its radial direction and produces a frictionally engaged support for the pipette tip. In order to release the pipette tip it is sufficient to disengage the O-sealing ring so that it contracts again, and the frictional engagement between the pipette tip and the O-sealing ring is cancelled. This has the advantage that high forces do not have to be applied on the pipette tip neither during the placement of the pipette tip nor during its release.

If a pipette tip, which is designed in the form of a cone in its area intended for coupling with the coupling stud, is pressed on the coupling cone of the first-mentioned solution or is placed on the coupling stud of U.S. Pat. No. A-5,063,790, whereby the O-sealing ring is squeezed, in both cases, the problem arises that the position of the pipette tip relative to the coupling stud cannot be adjusted in a defined manner. In the first case various pressing forces result in the pipette tip being shoved onto the coupling cone to various extents. This relates to the expansion of the pipette tip, which occurs in various degrees, depending on the amount of the pressing forces. In the second case, the O-sealing ring—if it is squeezed—presses against a cone surface of the pipette tip. If, in the beginning, there is still no frictional engagement between the O-sealing ring and the pipette tip, then the radial expansion of the O-sealing ring can lead to a slipping of the pipette tip.

A defined position of the pipette tip relative to the coupling stud is however, of essential importance, particularly for automated pipettes, which have a large number of pipette units. During the suctioning of the liquid, different positioning of the pipette tips of automated pipettes with tens or even several hundreds of pipette units can lead, for example, to some pipette tips being properly immersed in the vessels assigned to them or in depressions of a microtiter plate, whereas other pipette tips remain above the level of the liquid in the vessels or depressions. Likewise, it may happen that individual pipette tips hit the bottom of the vessels or depressions, and in this way their mouth opening is blocked, at least to some extent. The consequence can be an insufficient metering accuracy both in the liquid intake as well as in the liquid release.

Therefore the problem of the invention is to describe a way in which, particularly with automated pipette devices with a large number of pipette units, the metering accuracy can be improved during the transfer of liquids.

SUMMARY OF THE INVENTION

According to a first aspect in solving this problem, the invention is based on a pipette tip for placement on a pipette device, wherein the pipette tip has a jacket and a passage opening enclosed by the jacket, wherein the passage opening extends along a longitudinal axis between a first front end of the pipette tip, intended for immersion in a medium to be pipetted, and a second front end of the pipette tip, being opposite in an axial direction, and wherein the pipette tip, close to the second front end, has an area for the coupling with a coupling stud of the pipette device.

According to the invention it is provided that the jacket carries axial positioning means in the coupling area which are intended for interaction with complementary counter-axial positioning means of the coupling stud and which, together with the counter-axial positioning means, define an axial coupling position of the pipette tip on the pipette device. The axial positioning means allow to obtain a predetermined, defined axial position of the pipette tip, relative to the pipette device, in any placement of the pipette tip on the pipette device. This permits the equipping of all pipette units of an automated pipette with pipette tips at an accurate and equal position. In introducing into vessels or depressions of a microtiter plate different axial positions of the individual pipette tips do not occur, and for this reason the same liquid dosage can be suctioned or released by each pipette unit. This produces a metering accuracy of the pipette device which is, as a whole, increased.

Usually the pipette tip can be stuck with its second front end ahead, on the coupling stud; for this reason, the axial positioning means advantageously are placed at least in part on the inside circumference of the jacket, at an axial distance from the second front end of the pipette tip. At least in the coupling area the jacket inside circumference can have an envelope essentially formed by cylindrical sections.

The axial positioning means can comprise at least one axial stop placed on the jacket which is intended to interact with a complementary counter-stop of the coupling stud. When coupling the pipette tip to the coupling stud, the axial stop engages with the counter-stop of the coupling stud, so that a defined axial position of the pipette tip is established.

If, moreover, the coupling stud carries an elastically shapeable O-sealing ring, that meshes by means of an axial squeezing and thus a related radial expansion in a frictional engagement with a sealing surface of the pipette tip, a particularly simple, but nevertheless highly accurate possibility is given for the placement of the pipette tip on the pipette device.

With simple manufacturing technology, the axial stop can be formed by an axially-stepped shoulder of the jacket inside circumference, which connects a first cylindrical jacket inside circumference section having a larger diameter and being closer to the second front end, with a second cylindrical jacket inside circumference section having a smaller diameter and being farther from the second front end. Thereby the following dimensions are recommended: The diameter diminution from the first to the second jacket inside circumference section, caused by the stepped section, can be between 0.8 and 1.2 mm, preferably between 0.9 and 1.1 mm, and most preferably approximately 1.0 mm. The diameter of the first jacket inside circumference section can be between 6.5 and 7.1 mm, preferably between 6.7 and 6.9 mm, and most preferably approximately 6.8 mm. With regard to the diameter of the second jacket inside circumference section, this can be between 5.5 and 6.1 mm, preferably between 5.7 and 5.9 mm, and most preferably approximately 5.8 mm. It is recommendable to define a standard coupling interface between the pipette tip and the pipette device, so that pipette tips with different intake volumes for the liquids to be pipetted, but with standard coupling areas, can be combined with one and the same pipette device.

The exact axial positioning of the pipette tip by its axial stop and the counter-stop of the coupling stud can be further improved in that the jacket has a working surface for a prestress member, which is supported on the pipette device and which is intended to prestress its axial stop, axially, against the counter-stop of the coupling stud in the coupling position of the pipette tip. A particularly simple construction solution can be found in that the working surface is designed, to simultaneously provide for the sealing placement of a sealing element made of elastically shapeable material forming the prestress member and serving to seal off the pipette tip with respect to the coupling stud. Accordingly the sealing element takes over not only the sealing function, but simultaneously the prestress function as well. For the sealing element one can have recourse to solutions that are in fact known. Thus, the sealing element can be formed from an O-ring and, in accordance with U.S. Pat. No. A-5,063,790, can be compressible axially by a squeezing unit of the pipette device. In this case it may be provided that the working surface is shaped in such a way and located on the jacket so that in the coupling position of the pipette tip the sealing element is in an axially uncompressed state, essentially outside the prestress force-producing engagement with the working surface and, in the course of an axial compression enters into the prestress force-producing engagement with the working surface.

The axial supporting forces produced by an interaction of the working surface with the sealing element provide for a better support of the pipette tip at the coupling stud than is the case in the solution according to U.S. Pat. No. A-5,063,790. Also a strong squeezing of the sealing element such as in U.S. Pat. No. A-5,063,790 is not necessary, to attain a secure axial support of the pipette tip which increases the lifetime of the sealing element.

The working surface can, for example, be formed on a circumference groove, which is worked into the jacket inside circumference and in which the sealing element of the coupling stud can "engage." In considering a cross section containing the longitudinal axis the circumference groove can be bent in the form of an arc wherein its radius of curvature can be between 0.3 and 0.9 mm, preferably between 0.4 and 0.8 mm, and most preferably between 0.5 and 0.7 mm. The working surface is preferably axially located between the axial stop and the second front end of the pipette tip.

According to a further aspect for the solution of the problem formulated in the beginning, the invention provides a pipette device with at least one pipette unit which has a pipette channel extending along a channel axis, and a coupling stud for the coupling of a pipette tip, in particular, of the type described in the preceding, wherein, in accordance with the invention, the coupling stud has complementary counter-axial positioning means intended for interaction with axial positioning means of the pipette tip, which, together with the axial positioning means, define an axial coupling position of the pipette tip on the pipette unit.

Again the coupling stud can be stuck with a plug end, ahead into the pipette tip, wherein it is advantageously recommendable to place the counter-axial positioning devices, at least in part, on the outside circumference of the coupling stud at an axial distance from the plug-end.

In accordance with the previously mentioned cylindrical design of the jacket inside circumference of the pipette tip, the outside circumference of the coupling stud can have an envelope essentially formed of cylindrical sections at least in the area of the coupling stud, which in the coupling position projects into the pipette tip.

The counter-axial positioning means may comprise at least one complementary counter-stop at the coupling stud which is intended for interaction with an axial stop of the pipette tip. This counter-stop may be formed by a stepped shoulder on the outside circumference of the coupling stud.

The coupling stud can carry a sealing element, in particular an O-sealing ring made of an elastically shapeable material which is used for sealing between the pipette tip and the coupling stud, wherein a squeezing device for the axial compressing of the sealing element can be allocated to the pipette unit. The sealing element can have not only a sealing function but, at the same time can have a prestress function as well, if the pipette tip has a correspondingly shaped and located working surface for the sealing element which has a radial surface component and can be loaded with an axial force component from the sealing element.

According to another aspect the invention finally also concerns the combination of a pipette tip of the type described above with a pipette device of the type described above.

BRIEF DESCRIPTION OF THE DRAWINGS

The invention is explained in more detail below with the aid of the attached drawings. The figures represent the following.

DETAILED DESCRIPTION OF THE DISCLOSED EMBODIMENTS

Figure 1:
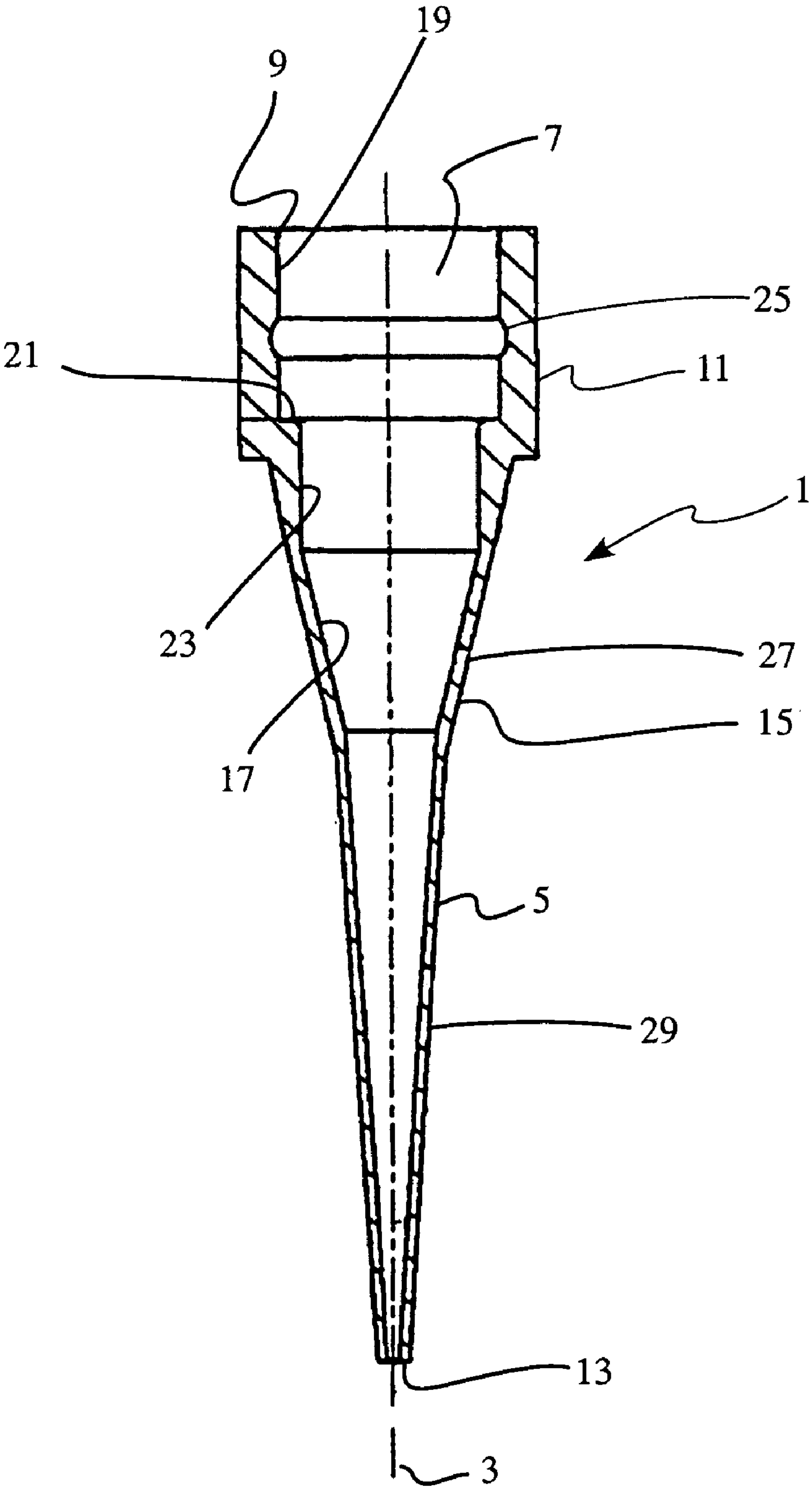
FIG. 1, in cross section, an embodiment of a pipette tip in accordance with the invention.

Reference is made to FIG. 1 first. There one can see a pipette tip 1 which is also designated as a tip, with a jacket

5 which is rotationally symmetric around a longitudinal axis 3 and encloses a passage opening 7 which axially passes through the pipette tip 1. As seen in FIG. 1, in the area of its upper, open front end 9, the pipette tip 1 has a coupling area 11 used for coupling to a pipette device that is not depicted in FIG. 1. Opposite the front end 9, the pipette tip 1 has a mouth end 13, which is intended for immersion in the medium to be pipetted.

The jacket 5 of the pipette tip 1 has an outside circumference 15 and an inside circumference 17. In the coupling area 11 the inside circumference 17 has a cylindrical inside circumference section 19, which essentially extends from the front end 9 to an annular stepped shoulder 21, followed by another cylindrical inside circumference section 23. The stepped shoulder 21 forms an axially directed stop surface. An annular groove 25, extending in the direction of the circumference is worked into the jacket 5 in the area of the inside circumference section 19. This annular groove 25 axially located between the front end 9 and the stepped shoulder 21, has a groove contour which follows an arc in the cross-sectional representation of FIG. 1.

Following the coupling area 11 the jacket 5 has a first conical wall section 27 and a second conical wall section 29, the conicality of which is weaker than that of the wall section 27. In the area of the wall sections 27 and 29 the jacket 5 is constructed with a smaller wall thickness than in the coupling area 11. The larger wall thickness in the coupling area 11 increases there the stability and rigidity of the pipette tip 1. This permits a secure and leakage-free coupling of the pipette tip 1 to a pipette device.

As a numerical example for the pipette tip shown in FIG. 1 the inside diameter of the jacket 5 in the area of the inside circumference section 19 can be approximately 6.8 mm, and in the area of the inside circumference section 23 it can be approximately 5.8 mm. The stepped shoulder 21 can be located at an axial distance from the front end 9 of approximately 5 mm. The radius of curvature of the circular contour of the annular groove 25 can be approximately 0.6 mm. The maximum radial depth of the annular groove 25 can be approximately 0.2 mm. The axial distance between the stepped shoulder 21 and the axial center of the annular groove 25—that is, its deepest point—can be approximately 2.1 mm.

In the other figures, the same reference symbols as in FIG. 1 are used for the same or functionally equivalent components of the pipette tip, but they are increased by the number 100. To avoid repetitions, reference is made to the preceding statements regarding FIG. 1.

Figure 2:
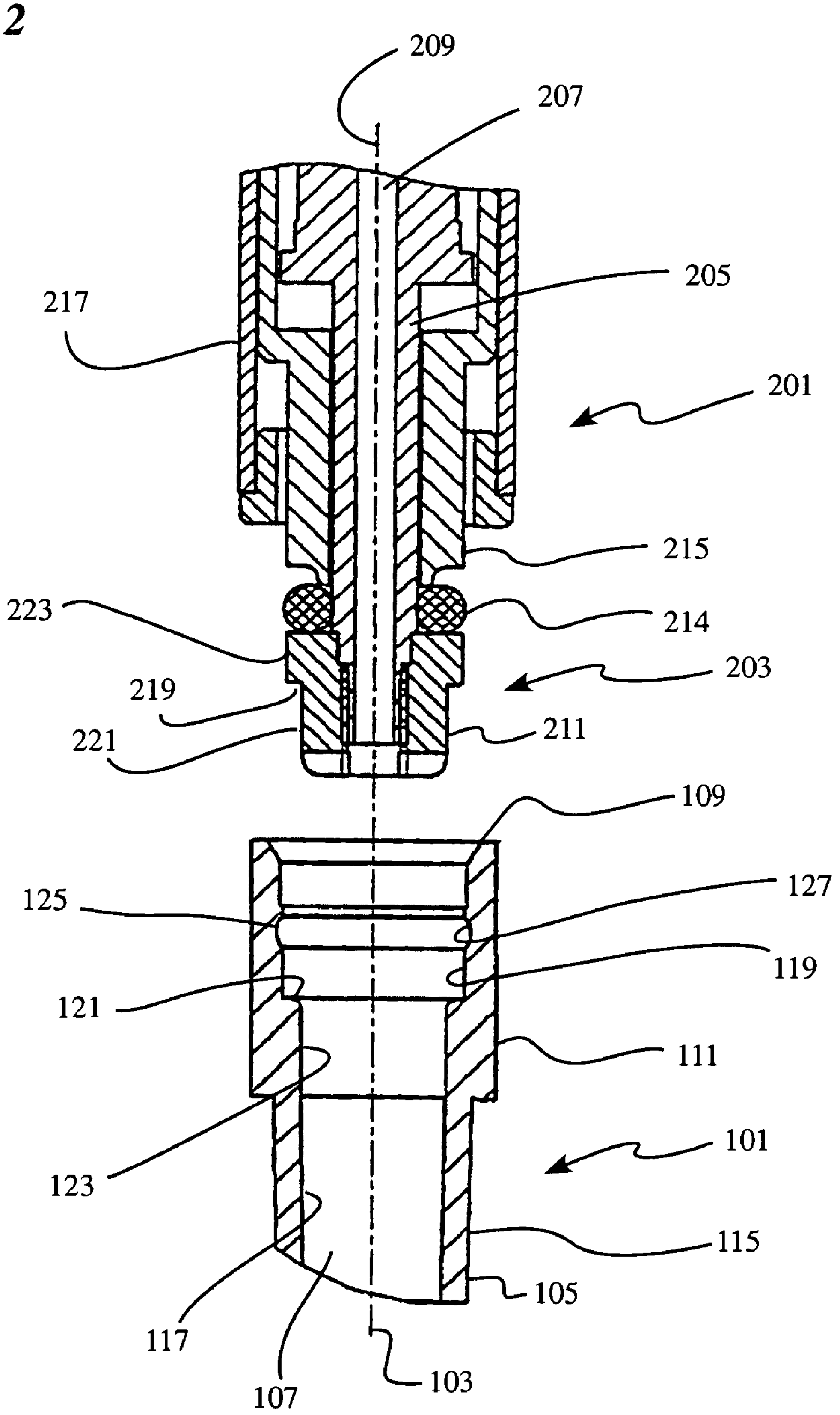
FIGS. 2–5 situations during the coupling of a pipette tip to a pipette device and during the release of the pipette tip.

In the upper part of FIG. 2 one can see a section of a pipette unit 201 which is a part of a pipette device which can be operated manually or automatically, and which has a coupling stud 203 intended for coupling with the pipette tip 101. The pipette device under consideration can carry a large number of such pipette units 201, for example, up to several hundred, in the formation as a pipette robot. The pipette unit 201 has a pipette tube 205 that contains a pipette channel 207 extending along a channel axis 209, and being continued in the coupling state of the pipette tip 101 on the pipette unit 201 by the passage opening 107 of the pipette tip 101. The coupling stud 203 comprises a coupling sleeve 211, which is placed firmly at the lower end of the pipette tube 205, for example, pressed onto it or screwed on it. An O-sealing ring 213 made of an elastically shapeable and, if desired, electrically conductive material is shoved onto the pipette tube 205 and is adjacent to the front side of the coupling sleeve 211 turned away axially from the pipette tip 101. Furthermore a squeezing sleeve 215 is shoved onto the pipette tube 205. This squeezing sleeve 215 can be slid axially relative to the pipette tube 205 and is used for the axial squeezing of the O-sealing ring 213. The squeezing sleeve 215 can be actuated by actuating means, which are not depicted. These actuating means can permit a manual or automatic actuation of the squeezing sleeve 215. For example, the squeezing sleeve 215 can be actuated hydraulically. It is also conceivable to provide a threaded drive for the adjustment of the squeezing sleeve 215 which can be actuated manually but which can also be actuated by means of an electric motor.

To release the pipette tip 101 furthermore a release member 217 is provided that is axially movable relative to the pipette tube 205, and which is designed as the squeezing sleeve 215 and the release tube enclosing the pipette tube 205 in the represented exemplified embodiment. The mode of actuation of the release mechanism 217 will be discussed in more detail further below.

An annular stepped shoulder 219 complementary to the stepped shoulder 121 of the pipette tip 101 is formed on the coupling sleeve 211, which upon inserting the coupling stud 203 into the pipette tip 101 strikes the stepped shoulder 121 of the pipette tip 101. By the interaction of these two stepped shoulder 121, 219 the axial position of the pipette tip 101, relative to the pipette unit 201 is precisely defined in the final assembly state. Toward the end of the coupling stud 203 which moves forward during insertion the coupling sleeve 211 has a cylindrical outside circumference section 221; its diameter is coordinated with the diameter of the inside circumference section 123 of the pipette tip 101 in the sense of a smooth-running sticking of the pipette tip 101 onto the coupling stud 203. Toward the axially seen other side, another cylindrical outside circumference section 223 of the coupling sleeve 211 follows the stepped shoulder 219; its diameter is coordinated in the same sense with the diameter of the inside circumference section 119 of the pipette tip 101.

Figure 3:
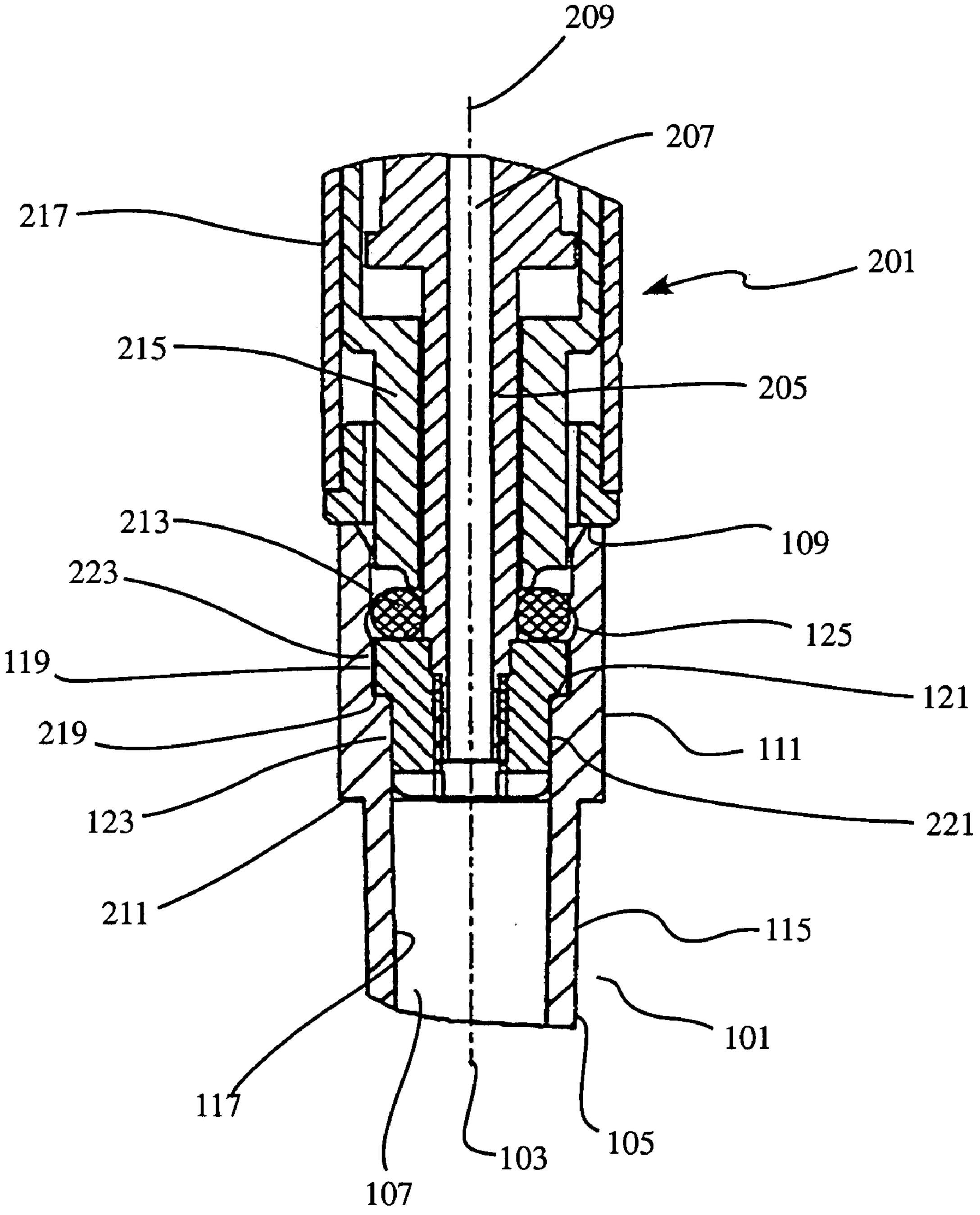
Figure 4:
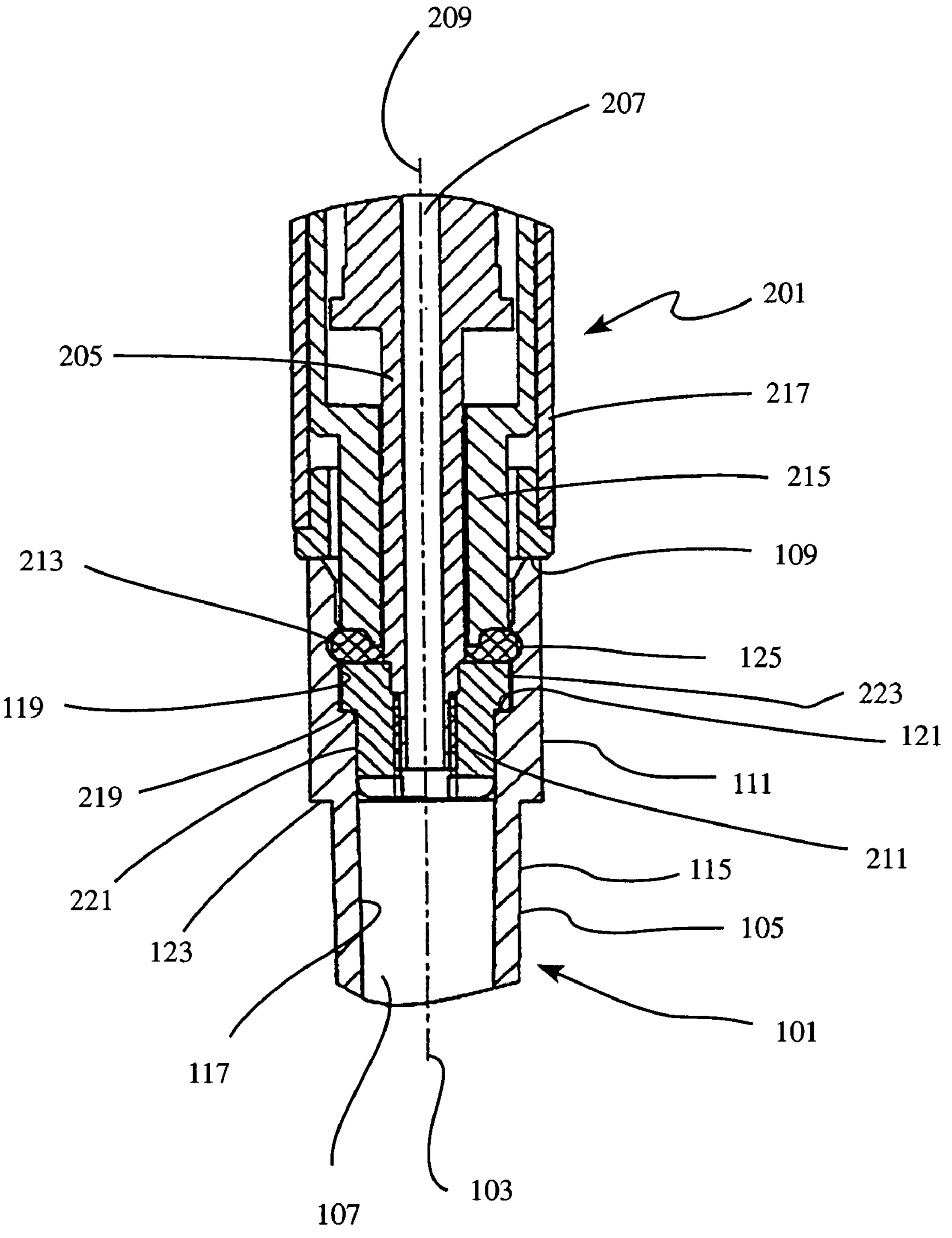
Figure 4A:
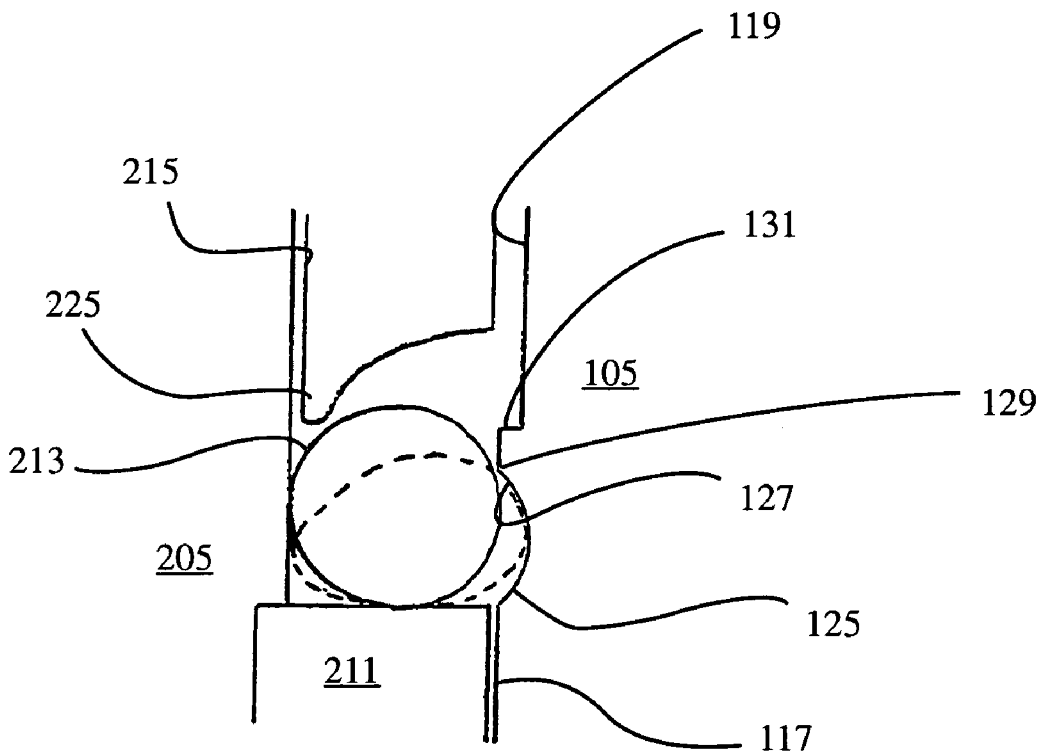

FIG. 3 shows the situation if the pipette tip 101 has been stuck on and the O-sealing ring 213 has not yet been squeezed. One can see that the axial distance of the stepped shoulder 219 of the coupling sleeve 211 from the axial front surface of the coupling sleeve 211, on which the O-sealing ring 213 lies, is dimensioned in such a way that in the sticking position shown in FIG. 3, the O-sealing ring 213 is moved axially somewhat with respect to the annular groove 125. Stated more precisely the axial center of the annular groove 125 with respect to the axial center of the uncompressed O-sealing ring 213 is moved somewhat toward the pipette tip 101. Starting from this sticking position the squeezing sleeve 215 is moved axially downwards in the direction of the pipette tip 101, so as to achieve an axial squeezing of the O-sealing ring 213. In this regard, reference is made to FIGS. 4 and 4*a*, of which FIG. 4 shows that state in which the squeezing of the O-sealing ring 213 has been finished and in which the final assembly position of the pipette tip 101 is reached on the pipette unit 201, and of which FIG. 4*a* shows an enlarged section in the area of the O-sealing ring 213. When considering the last figure, one can see that the squeezing sleeve 215 has a forward tip 225 on its end facing the O-sealing ring, which penetrates between the O-sealing ring 213 and the pipette tube 205 upon approach of the squeezing sleeve 215 to the O-sealing ring 213, so that the O-sealing ring 213 is compressed not just axially, but also radially by the tip 225, somewhat toward the annular groove 125. In the course of its squeezing the O-sealing ring 213 as a whole undergoes an enlargement of its outside diameter. Its radially pressed-out parts can escape into the space recessed by the annular groove 125 which is indicated by a dashed line in FIG. 4*a*. The parts of the O-ring 213 escaping into the annular groove 125 attempt to relax and expand in the annular groove 125 wherein they arrive at the bottom of the annular groove 125 and press against it. The previously addressed axial displacement of the annular groove 125, with respect to the O-sealing ring 123, causes the O-sealing ring 213 to press primarily against the axially upper area of the bottom of the annular groove 125, in FIG. 4*a*. In this area the bottom of the annular groove 125 forms a working surface 127 for the O-sealing ring 213. This working surface 127 has a radial component as a result of its curvature, so that in case the O-sealing ring 213 presses against the working surface 127, a force is exerted on the pipette tip 101 with an axial component. This axial force prestresses the stepped shoulder 121 of the pipette tip 101 axially against the stepped shoulder 219 of the coupling sleeve 211, whereby a secure axial support of the pipette tip 101 on the pipette unit 201 is achieved. As a result of the force with which the O-sealing ring 213 presses against the working surface a tight placement of the O-sealing ring 213 on the working surface 127 is established, so that a secure sealing is guaranteed between the pipette tip 101 and the pipette unit 201.

One can see in FIG. 4*a* that the O-sealing ring 213 does not necessarily completely fill the axially lower area of the annular groove 127 in its squeezed position (shown as a dashed line). Although this is possible, what is important, however, is that the engagement conditions between the squeezed O-sealing ring 213 and the annular groove 125 are established in such a way that such a resulting axial force is always exerted on the pipette tip 101 by the O-sealing ring 213 that the previously addressed pressing of the stepped shoulder 121 of the pipette tip 101 against the stepped shoulder 219 of the coupling sleeve 211 is achieved. The final coupling state of the pipette tip 101 on the pipette unit 201, in which the secure and sealing support of the pipette tip 101 on the pipette unit 201 is achieved by the axial squeezing and radial expansion of the O-sealing ring 213, is shown in FIG. 4.

For the release of the pipette tip 101, the squeezing sleeve 215 is moved up axially from its squeezing position shown in FIG. 4, whereby the O-sealing ring 213 is relaxed again and drawn back from the annular groove 125. The prestress force exerted on the stepped shoulders 121, 219 in the coupling state according to FIG. 4, is thereby cancelled. The state shown in FIG. 3 is finally established once again. Advantageously, in this state in accordance with FIG. 3, the O-sealing ring 213 will not be completely out of contact with the inside circumference 117 of the pipette tip 101, but rather will be in such engagement with the inside circumference 117 of the pipette tip 101 that the pipette tip 101 does not fall by itself from the pipette unit 201.

Considering FIG. 4*a* in this situation the O-sealing ring 213, for example, can collide onto the transition edge designated as 129 between the annular groove 125 and the cylindrical inside circumference section 119 of the pipette tip 101. To release the pipette tip 101 this transition edge 129 must be moved past the O-sealing ring 213 which is possible only with a simultaneous slight radial compressing of the O-sealing ring 213. This radial compression of the O-sealing ring 213, however, acts to increase friction which would run contrary to the requirement of a smooth sliding off of the pipette tip 101 from the pipette unit 201. For this reason, the cylindrical inside circumference section 119 of the pipette tip 101 located above the annular groove 125 is preferably constructed with steps as can be seen in particular in FIG. 4*a*. In a small axial distance from the transition edge 129 it has a step expansion formed by a step 131 which produces a corresponding diameter enlargement of this inside circumference section 119. If the O-ring 213 has overcome the “constriction zone” formed between the transition edge 129 and step 131 it can relax completely and it loses contact with the inside circumference 117 of the pipette tip 101, so that the pipette tip 101 can then be smoothly slipped off from the pipette unit 201.

In order not to have to perform the slipping off of the pipette tip 101 from the pipette unit 201 manually the release member 217 is provided. This can be actuated in different ways. For example, a hydraulic actuation of the release member 217, or one using an electric motor, is conceivable. Alternatively, a prestress spring, which is not depicted can act upon the release member 217; it is stressed when the pipette tip 101 is set on the pipette unit 201 when the pipette tip 101 presses the release tube forming the release member 217 upwards by its front end 109. If the squeezing of the O-sealing ring 213 is then cancelled this release prestress stress spring is again relaxed. By its spring force it presses the release tube 217 downwards once again, which is accompanied by a release of the pipette tip 101. It is clear that the release prestress spring is dimensioned in such a way that the force exerted by it on the release tube 217 in the stressed state does not exceed the axial support force of the O-sealing ring 213. Simultaneously, it is dimensioned in such a way that the force exerted on the pipette tip 101 in the course of its relaxation is sufficient to move the edge 129 past the O-sealing ring 213.

Figure 5:
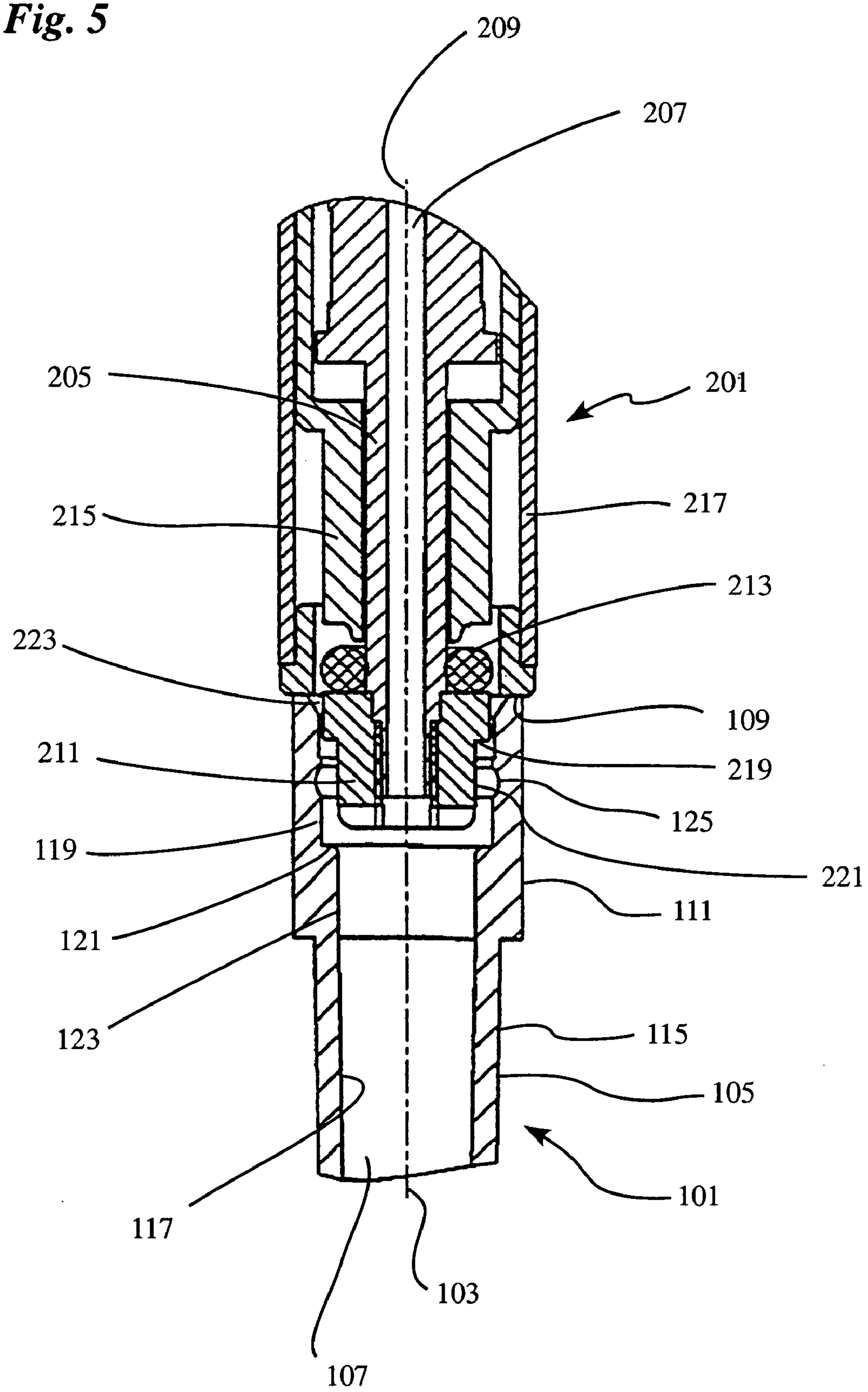

FIG. 5 shows the release state in which the release member 217 has moved downwards, and the pipette tip 101 has moved completely past the O-sealing ring 213.

It is clear that suitable suction means are associated to the pipette tube 205 of the pipette unit 201, which permit to produce a reduced pressure in the pipette channel 207 and thus in the pipette tip 101, which leads to the suctioning in of the liquid to be pipetted. This suctioning means can comprise, for example, a piston placed axially movable in the pipette tube 205, being axially displaceable by means of electrical, hydraulic, or pneumatic actuation means.

The pipette tip 101 is preferably made of a plastic material, for example, by injection molding. This plastic material may be electrically conductive, to be able to carry out conductivity measurements in the liquid to be pipetted in a manner that is, in fact, known. Accordingly the coupling sleeve 211 and the pipette tube 205 may also be made of conductive materials. For reasons having to do with strength and wear and tear, metals are preferably used here, although plastic materials are not ruled out for the coupling sleeve 211 and the pipette tube 205. The capacity of the pipette tip 101 designed as a disposable article can be between 0.1 and 1300 μL, for example.

What is claimed is:

1. A pipette device, comprising:

a pipette unit (201) having a pipette tip including a working surface (127) with a radially extending surface component; wherein the pipette unit (201) has a coupling stud (203) onto which the pipette tip can be mounted for coupling; wherein the coupling stud (203) comprises a counter-stop (219) and an adjustable prestress member (213), that can be adjusted into a prestress state and a release state via an actuation device which is provided in the coupling stud; wherein the pipette tip (101) has an axial stop (121) which interacts with said counter-stop (219) of the coupling stud (203) in an axial coupling position of the pipette tip (101) such that the prestress member (213) in the prestressed state, acts upon said surface component of said working surface (127) of the mounted pipette tip (101) in such a way that the prestress member abuts sealingly on the working surface, and prestresses the pipette tip (101) on the pipette unit (201) into the axial coupling position; and wherein the prestress member (213) in the release state, releases the working surface (127) of the pipette tip (101).

2. The pipette device of claim 1, wherein the working surface (127) is formed by an annular groove (125).

3. The pipette device of claim 1, wherein said pipette tip further comprises a front end (109) and a jacket (105) with an inside circumference (117); wherein the axial stop (121) is located, at least in part, on said inside circumference (117) of said jacket (105) of the pipette tip; at an axial distance from the front end (109) of the pipette tip (101).

4. The pipette device of claim 3, wherein the jacket inside circumference (117) has an envelope, which is substantially formed by cylindrical sections (119, 123).

5. The pipette device of claim 1, further comprising a jacket having an inside circumference (117) and first and second inside circumference sections, and wherein the axial stop (121) is formed by a stepped section of the jacket inside circumference (117), which connects said first cylindrical jacket inside circumference section (119) having a larger diameter and being closer to a front end (109) than said second cylindrical jacket inside circumference section (123) having a smaller diameter and being further away from the front end (109).

6. The pipette device of claim 5, wherein a diameter diminution from the first (119) to the second (123) jacket inside circumferential section, formed by said stepped section, is between 0.8 and 1.2 mm.

7. The pipette device of claim 5, wherein the diameter of the first jacket inside circumference section (119) is between 6.5 and 7.1 mm.

8. The pipette device of claim 5, wherein the diameter of the second jacket inside circumference section (123) is between 5.5 and 6.1 mm.

9. The pipette device of claim 5, wherein the pipette tip comprises a front end (109), and wherein the pipette unit further comprises an annular groove (125) axially located between the front end (109) and the axial stop (121), and wherein the groove cross section of the annular groove (125) is limited by an arc and has a radius of curvature between 0.3 and 0.9 mm.

10. The pipette device of claim 3, wherein the working surface (127) is located axially between the axial stop (121) and the front-end (109) of the pipette tip (101).

11. The pipette device of claim 1, wherein the coupling stud has an outer circumference, and wherein the counter-stop (219) is formed by a stepped shoulder on the outside circumference of the coupling stud (203).

12. The pipette device of claim 1, wherein the coupling stud (203) carries said prestress member, a sealing element (213), used for sealing between the pipette tip (101) and the coupling stud (203); said sealing element is made of elastically shapeable material; and wherein a squeezing device (215) for the axial compression of the sealing element (213) is provided on the pipette unit (201) to be actuated by said actuation device.

13. The pipette device of claim 12, wherein the sealing element (213) is an O-ring.

14. The pipette device of claim 12, wherein the material of the sealing element is electrically conductive.

15. A pipette device, comprising a pipette unit (201) and a pipette tip (101) comprising an axial positioning means (121, 127) including an axial stop (121) and a work surface (127) with a radial surface component, wherein the pipette unit (201) has an elongated pipette channel (207) extending along a channel axis (209) and a coupling stud (203) for the coupling of the pipette tip (101); wherein the coupling stud (203) has an adjustable prestress member (213) that can be adjusted via an actuation device into a prestress state and a release state; wherein the coupling stud (203) has complementary counter-axial positioning means (213, 219) including said prestress member (213) and a complimentary counter-axial stop (219); said complimentary counter-axial positioning means is intended for interaction with said axial positioning means (121, 127) of the pipette tip (101); wherein said complimentary counter-axial positioning means in contact with the axial positioning means (121, 127) defines an axial coupling position of the pipette tip (101) on the pipette unit (201); wherein the prestress member (213) in its prestress state acts upon said radial surface component of the working surface (127) of the pipette tip (101) in such a way that it prestresses the axial stop (121) in a sealing placement with the complementary counter-axial stop (219), into the coupling position of the pipette tip (101) prestress member (213) on the pipette unit (201); and wherein the release state of the prestress member essentially releases the working surface (127) of the pipette tip (101) for the simple removal of the pipette tip (101) from the pipette unit (201).

* * * * *